W. T. HENWOOD.
UNIPOD FOR CAMERA SUPPORTS.
APPLICATION FILED MAR. 14, 1916.
1,202,518.
Patented Oct. 24, 1916.
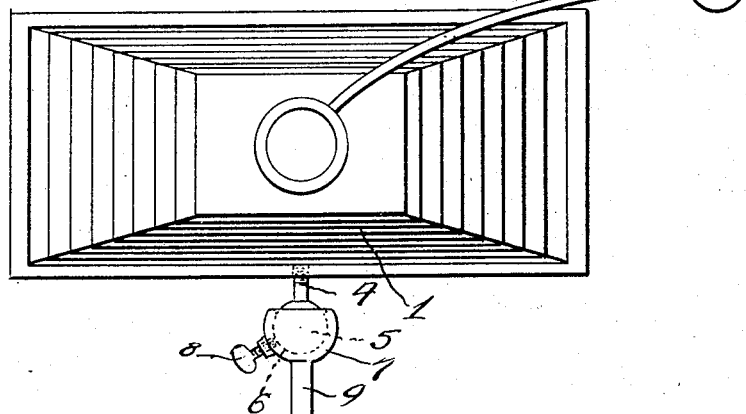
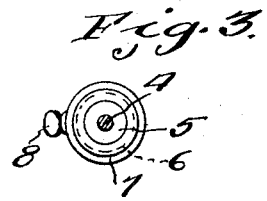
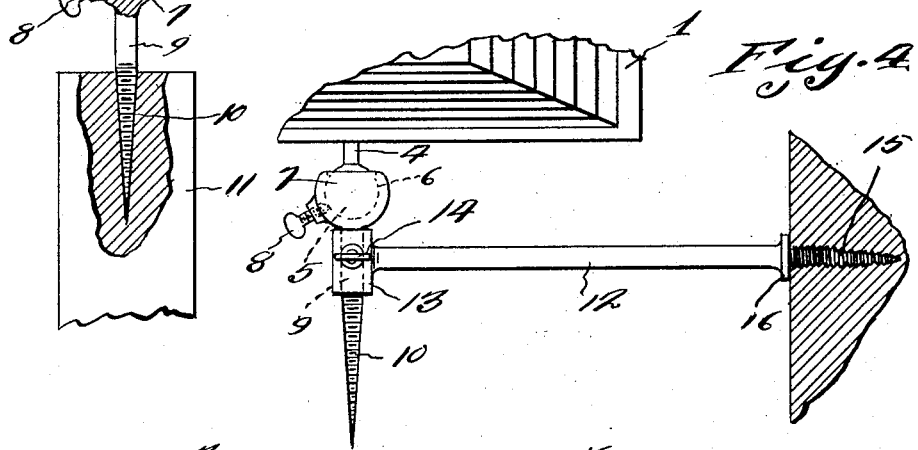
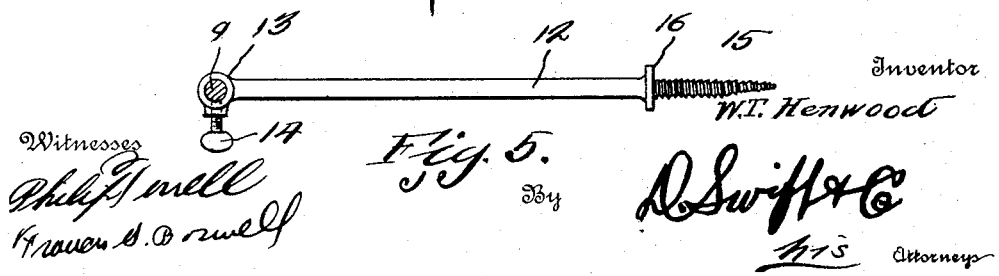
Inventor
W. T. Henwood

UNITED STATES PATENT OFFICE.

WILFRED THOMAS HENWOOD, OF VICTOR, COLORADO.

UNIPOD FOR CAMERA-SUPPORTS.

1,202,518. Specification of Letters Patent. Patented Oct. 24, 1916.

Application filed March 14, 1916. Serial No. 84,116.

*To all whom it may concern:*

Be it known that I, WILFRED THOMAS HENWOOD, a citizen of the United States, residing at Victor, in the county of Teller, State of Colorado, have invented a new and useful Unipod for Camera-Supports; and I do hereby declare the following to be a full, clear, and exact description of the invention, such as will enable others skilled in the art to which it appertains to make and use the same.

This invention relates to an improved camera support or unipod, and an object of the invention is to provide a device of this kind, whereby a camera may be supported upon a post or the like, or upon the vertical side of a wall, say for instance, on the side of a fence, or the side of a house or the like.

Another object of the invention is the provision of a support or unipod comprising improved features of construction.

One of the features of construction is the provision of a tapering screw having a universal connection with a second screw, which is threaded into the bottom of the camera, while the first screw is designed to be threaded into a post or other like vertical support, the universal connection including means to hold the camera in various adjusted angular positions.

Another feature of the invention is the provision of a supporting rod terminating in a screw at one end, and a sleeve at the other end to receive a cylindrical part of the first screw, there being a set screw to hold the first screw in the sleeve in different positions, the screw of the rod designed to enter the vertical side wall of a suitable support, to hold said camera supported therefrom.

In practical fields the details of construction may necessitate alterations, falling within the scope of what is claimed.

The invention comprises further features and combination of parts, as hereinafter set forth, shown in the drawings and claimed.

In the drawings: Figure 1 is a view in elevation of a camera, showing the same supported by the improved support or unipod. Fig. 2 is a sectional view. Fig. 3 is a plan view of the universal connection. Fig. 4 is a view in elevation of a part of the camera, showing the support or unipod shown in Fig. 1, as supported upon a horizontal support or rod. Fig. 5 is a plan view of the rod shown in Fig. 4.

Referring more especially to the drawings, 1 designates a conventional form of camera, the bottom of which has threaded therein a metal socket 2, the interior of which is supplied with threads 3, which are engaged by the screw 4, the lower end of which terminates in a spherical member or ball 5, which is mounted in a spherical socket or bearing 6 of the spherical casing 7. The ball or member 5 is first inserted in the spherical socket or bearing, then the upper peripheral edge portion of said casing 7 is pressed to overlie the ball, and to conform to the contour thereof, in such wise that the ball may freely move. However, a thumb screw is threaded radially through the casing 7, to bear against the ball or member 5, so as to hold the same in various adjusted positions. The casing 7 has formed integral therewith a shank 9, which terminates in a tapering screw 10. This shank 9, when the camera is disposed normal to the shank 9, as shown in Figs. 1 and 2, is alined axially with the screw 4. The tapering screw 10 is designed to be threaded into any suitable vertical post or like support 11. By this form of unipod or support, a photographer may avoid carrying the usual tripod, in lieu of which the photographer may support his camera upon a fence post or the like, or upon a tree stump or the like. Also to be carried by the photographer is a rod 12, one end of which is provided with a sleeve 13 to receive the cylindrical part of the shank 9, there being a set screw 14 threaded through the sleeve 13 to engage the shank, in order to hold the same in different positions. The other end of the rod 12 terminates in a tapering part 15 having threads, whereby the same may be threaded into the vertical wall, or one side or the other of a fence, or in the side of a tree, so as to support the camera upon the rod 12, the shank 9 being received in the sleeve 13. The rod 12 has an integral collar 16 to limit the threaded tapering part 15 into the vertical wall or tree.

The invention having been set forth, what is claimed as new and useful is:

In combination, a pair of axially disposed screws, one designed to enter an implement, the other designed to be threaded into a support, said screws having a universal connection, whereby one screw may be adjusted to various obtuse angles to the other screw, and means to coöperate with the parts of the universal connection, whereby one of said screws is held in such various obtuse angular positions, the shank of one of said screws having a cylindrical part, a rod designed to be disposed substantially horizontally having a sleeve at one end to receive said cylindrical part, a screw to hold the cylindrical part in the sleeve in adjusted position, the other end of the rod support having a tapering threaded extremity to be threaded into a stationary support.

In testimony whereof I have signed my name to this specification in the presence of two subscribing witnesses.

WILFRED THOMAS HENWOOD.

Witnesses:
D. L. McFarlane,
J. E. Woods.